(12) United States Patent
Caruel

(10) Patent No.: US 11,136,939 B2
(45) Date of Patent: Oct. 5, 2021

(54) NACELLE FOR A TURBOJET ENGINE INCLUDING A CASCADE THRUST REVERSER

(71) Applicant: Safran Nacelles, Gonfreville l'Orcher (FR)

(72) Inventor: Pierre Caruel, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 85 days.

(21) Appl. No.: 16/730,572

(22) Filed: Dec. 30, 2019

(65) Prior Publication Data
US 2020/0149495 A1    May 14, 2020

Related U.S. Application Data

(63) Continuation of application No. PCT/FR2018/051560, filed on Jun. 26, 2018.

(30) Foreign Application Priority Data

Jun. 30, 2017   (FR) ...................................... 1756141

(51) Int. Cl.
*F02K 1/72* (2006.01)

(52) U.S. Cl.
CPC ..................................... *F02K 1/72* (2013.01)

(58) Field of Classification Search
CPC ... F02K 1/72; F02K 1/70; F02K 1/763; F02K 1/62; F02K 1/625
See application file for complete search history.

(56) References Cited

U.S. PATENT DOCUMENTS

| | | | | |
|---|---|---|---|---|
| 2012/0193448 A1* | 8/2012 | Caruel | ..................... | F02K 1/763 239/265.29 |
| 2015/0152811 A1* | 6/2015 | Kerbler | ..................... | F02K 1/12 239/265.19 |
| 2016/0131078 A1* | 5/2016 | Gormley | ..................... | F02K 3/06 239/265.33 |
| 2016/0131082 A1* | 5/2016 | Gormley | ..................... | F02K 1/72 239/265.19 |
| 2016/0160799 A1 | 6/2016 | Gormley | | |
| 2016/0333822 A1* | 11/2016 | Roberts | ..................... | F02K 1/09 |
| 2021/0131380 A1* | 5/2021 | Gormley | ..................... | F02K 1/72 |

FOREIGN PATENT DOCUMENTS

| | | |
|---|---|---|
| EP | 3018328 | 5/2016 |
| GB | 866900 | 5/1961 |

OTHER PUBLICATIONS

International Search Report for International Application PCT/FR2018/051560, dated Oct. 15, 2018.

* cited by examiner

Primary Examiner — Gerald L Sung
(74) Attorney, Agent, or Firm — Burris Law, PLLC

(57) ABSTRACT

A nacelle for a turbojet includes a thrust reverser having cascades, movable cowls adjacent to the cascades in a closed position, linkage systems for connecting the cowls and the cascades, and tilting closure flaps. Each linkage system is arranged radially outside the cascades, and includes, in a tangential plane, a lever, connecting rods, and pivots allowing a movement substantially in this plane. The pivots include a fixed pivot connected to a fixed element of the nacelle, a pivot connected to the cascades and a pivot connected to the cowls. The lever, termed first lever, includes two arms forming a "V," and two connecting rods are fixed to the end of an arm by a pivot.

9 Claims, 5 Drawing Sheets

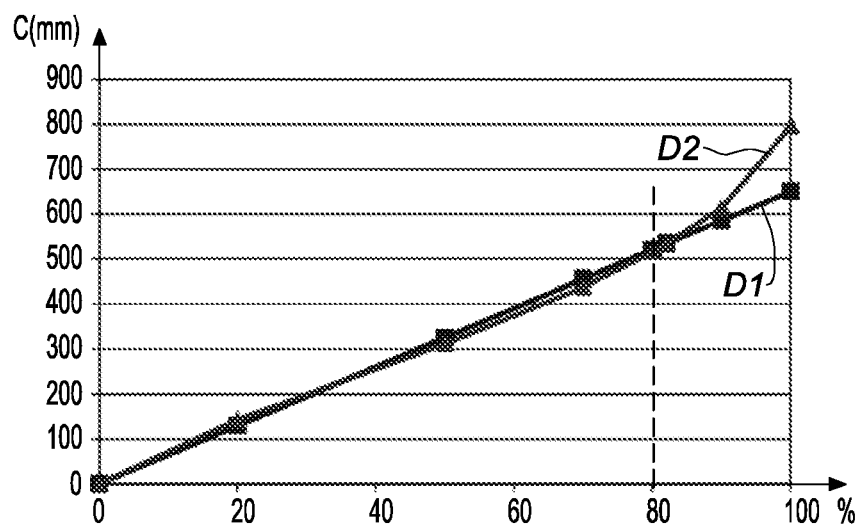
Fig. 10
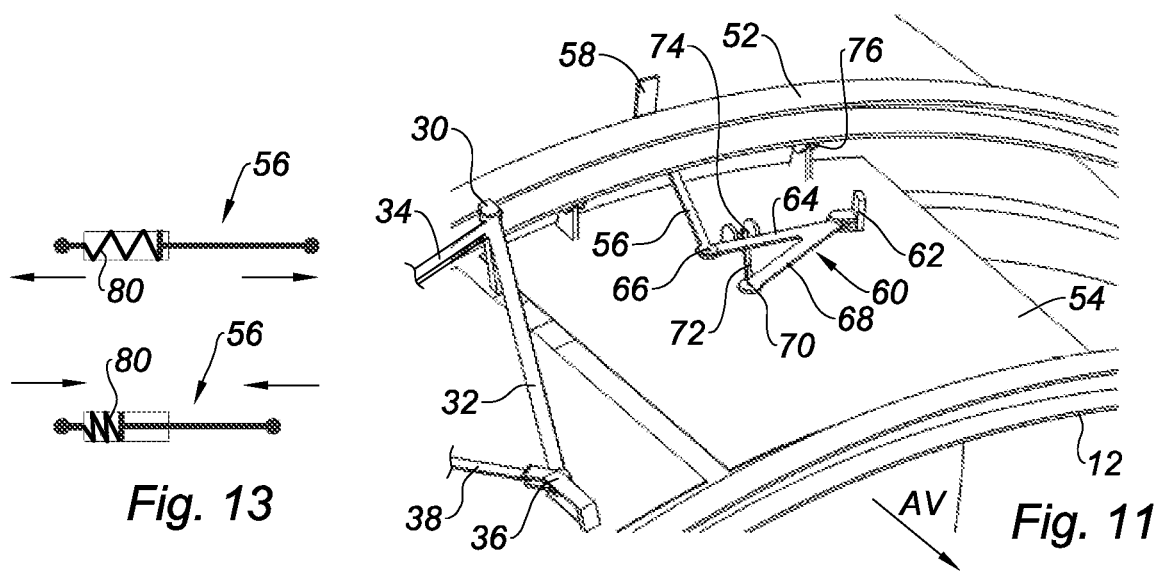
Fig. 13
Fig. 11
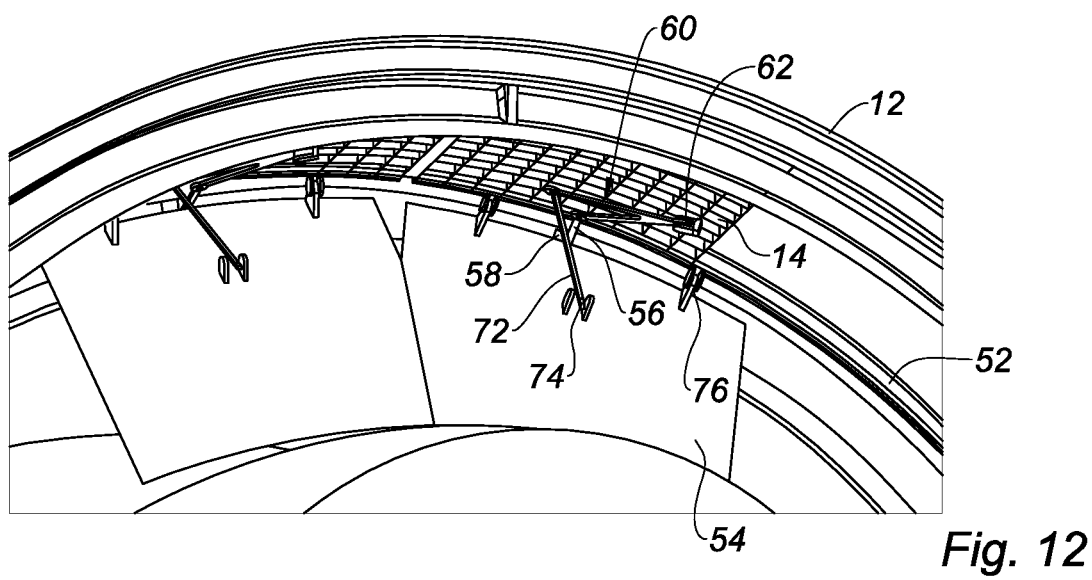
Fig. 12

NACELLE FOR A TURBOJET ENGINE INCLUDING A CASCADE THRUST REVERSER

CROSS-REFERENCE TO RELATED APPLICATIONS

This application is a continuation of International Application No. PCT/FR2018/051560, filed on Jun. 26, 2018, which claims priority to and the benefit of FR 17/56141 filed on Jun. 30, 2017. The disclosures of the above applications are incorporated herein by reference.

FIELD

The present disclosure relates to a nacelle intended for a turbojet engine, including a cascade thrust reverser generating a cold air flow forwards.

BACKGROUND

The statements in this section merely provide background information related to the present disclosure and may not constitute prior art.

Turbojet engines for motorizing aircraft are generally disposed along a longitudinal axis, inserted in a nacelle, receive fresh air from the front side, and reject from the rear side the hot gases produced by combustion of the fuel generating thrust.

For bypass turbojet engines, fan blades disposed around the engine generate a considerable secondary flow of cold air along an annular flow path passing between this engine and the nacelle, which generates most of the thrust.

Some nacelles include a thrust reversal system which at least partially closes the cold air annular flow path, and rejects the secondary flow radially outwards by directing it forwards in order to generate a reverse thrust for braking the aircraft.

A known type of cascade thrust reverser, presented in particular by the document U.S. Publication No. 2016/0160799, includes rear movable cowls sliding axially rearwards under the effect of cylinders, to open lateral air passages on the nacelle containing cascades.

The rear cowls are connected by control tie-rods mounted on articulations, describing curves in an axial plane, to the thrust reverser cascades driven rearwards, and to flaps for closing the main flow.

The tie-rods are disposed so as to obtain a translation of the cascades rearwards which is less considerable than that of the cowls, and a tilting of the flaps in the cold air annular flow path which at least partially closes this flow path while directing the flow radially outwards through cascades returning this flow forwards.

Nonetheless, this thrust reverser type including tie-rods disposed below the cascades, describing curves in an axial plane, occupies a relatively considerable volume below these cascades which does not allow optimizing the aerodynamic shapes of the annular flow path, as well as its lining with soundproofing panels.

SUMMARY

The present disclosure provides a nacelle for a turbojet engine including a thrust reverser comprising thrust reverser cascades disposed around the nacelle, at least one movable cowl adjacent to the cascades in a closed position, an actuation generating a backward movement of the cascades or the cowl towards an open position, linkage systems connecting the movable cowls and the cascades, and tilting flaps for closing the cold air annular flow path, the nacelle being remarkable in that each connecting system disposed radially outside of the cascades includes in a tangential plane a lever, connecting rods, and articulations authorizing movements substantially in this plane, comprising a fixed articulation connected to the fixed structure of the nacelle, a cascade articulation connected to the cascades and a cowl articulation connected to at least one movable cowl, the connecting system imparting at the end of the opening movement a stroke of the movable cowl larger than that of the cascades.

An advantage of the nacelle is that each connecting system disposed in a tangential plane above the cascades clears the space below the cascades allowing disposing below a mechanism for controlling the tilting flaps, which improves the aerodynamic shape of the cold air flow path, as well as the lining of the surfaces of the flow path with soundproofing materials.

In addition, each connecting system achieves at the end of the backward movement a larger stroke of the cowls compared to the cascades, allowing largely clearing the passage of air throughout the cascades. In this way, it is possible to use one single actuating system to displace the cascades, which in turn causes the cowl to present, at the end of the movement, a larger opening stroke of the cowls.

In addition, the nacelle, according to the present disclosure, may include one or more of the following features, which may be combined together.

Advantageously, the stroke of the movable cowl is larger than that of the cascades from a backward movement of the cascades exceeding 70% of the total backward movement.

Advantageously, each connecting system includes a first lever comprising two arms forming a "V," and two connecting rods each fastened at the tip of an arm by an articulation. This simple mechanism is sufficient to obtain the differential movement of the cascades and of the cowls.

In this case, each lever may include a fixed articulation disposed at the connection of the two arms, connected to a fixed element of the structure of the nacelle, a rear arm being connected by a cascade connecting rod to an articulation fastened to the cascades, a front arm being connected by a cowl connecting rod to an articulation fastened to at least one movable cowl.

In particular, in the closed position, each connecting rod can form with the arm supporting it an acute angle.

In particular, in the fully open position, the cascade connecting rod can form with the rear arm a substantially flat angle, and the cowl connecting rod can form with the front arm an obtuse angle.

Advantageously, the nacelle includes mechanisms for controlling the tilting flaps, which in the closed position are fully integrated above the internal surface of the cold air flow path. In this way, no mechanical element disturbs the cold air flow path.

In this case, each mechanism for controlling a tilting flap is advantageously connected only to the movable cowl and to the cascades, while being actuated by a relative movement between these two sets. In this way, no additional actuator is used for the movement of the tilting flaps.

This mechanism enables the flap to clear the fixed structure before tilting, thanks to the relative movement starting only at about 70% of the stroke of the cascades.

In particular, each control mechanism may include a second lever fastened by an articulation to the cascades, connected by a first tie-rod to the movable cowls, and connected by a second tie-rod to a tilting flap.

Advantageously, the nacelle includes a deflection edge forming an annular guide of the cold air disposed at the front of the cascades, comprising a movable radially outer portion fastened to the front of the cascades, which fits in the open position on a fixed radially inner portion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 10 is a graph showing the strokes of the cascades and of the cowls according to the present disclosure;

FIG. 11 is a perspective view of the actuating mechanism of the flaps of the nacelle with closed flaps according to the present disclosure;

FIG. 12 is a perspective view of the actuating mechanism of the flaps of the nacelle with open flaps according to the present disclosure;

FIG. 13 is a schematic diagram showing a tie-rod of the mechanism in two positions according to the present disclosure;

Figure 1:
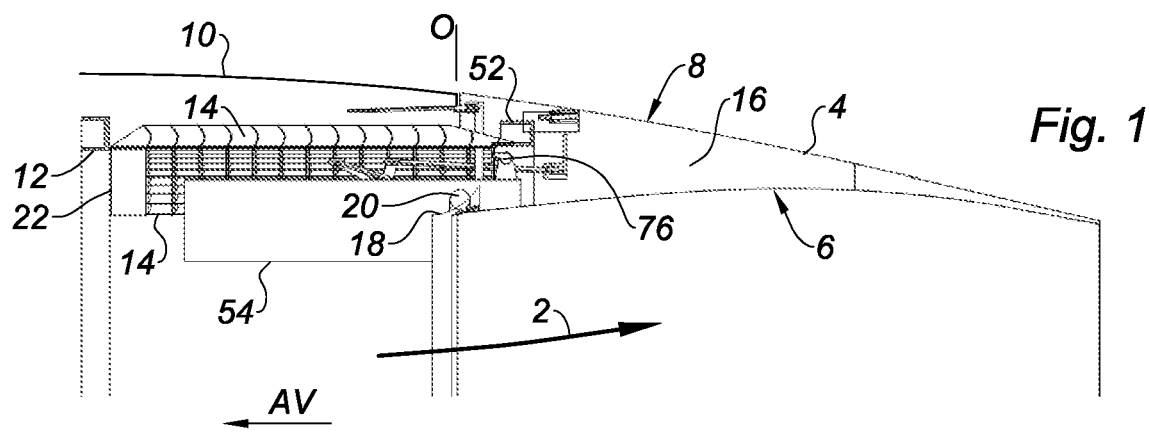
FIG. 1 is a cross-sectional view of a nacelle with the closed cowls according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For more clarity, identical or similar elements are marked with identical reference signs throughout the figures.

Figure 2:
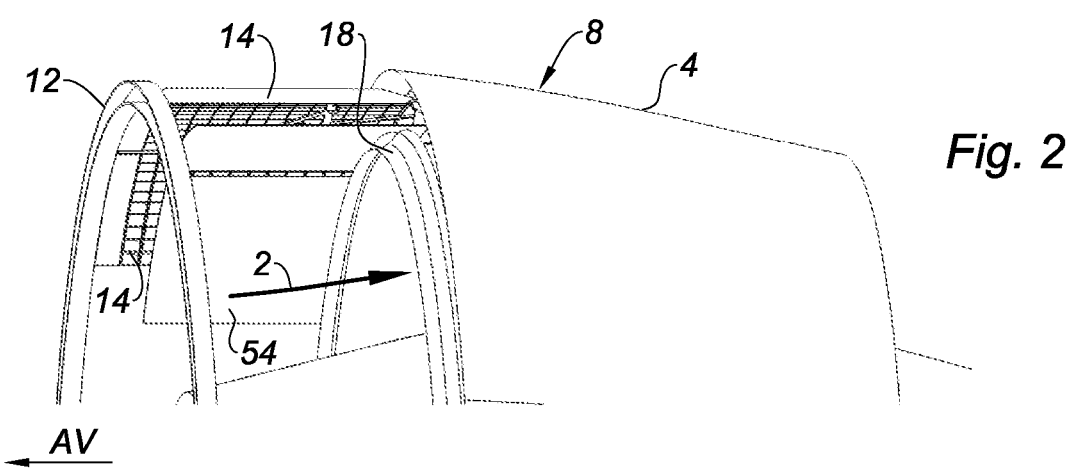
FIG. 2 is a perspective view of a nacelle with closed cowls according to the present disclosure.
Figure 3:
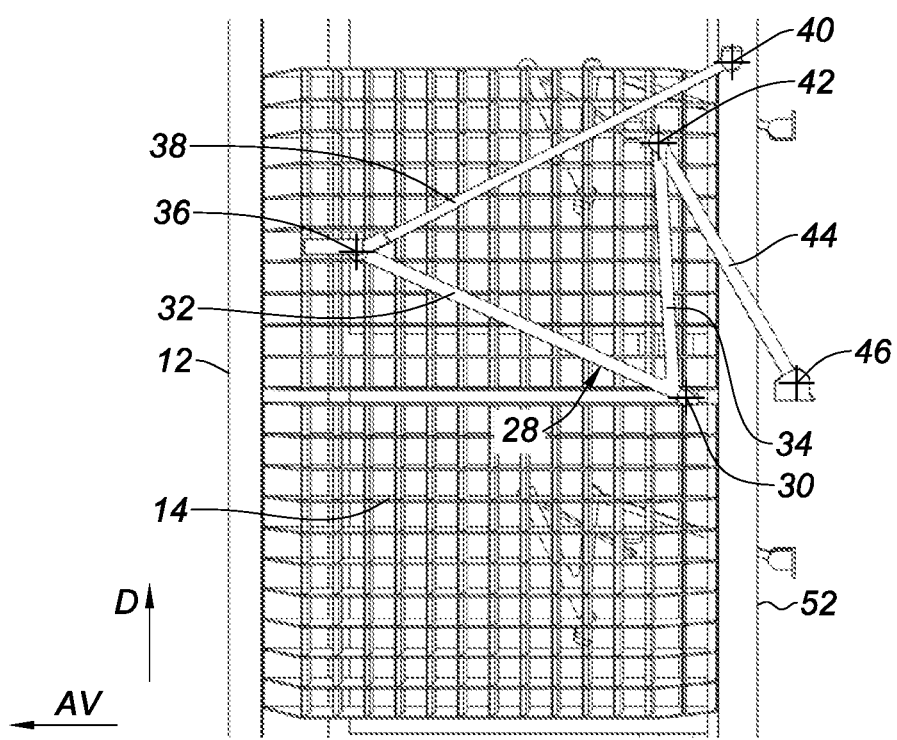
FIG. 3 is a top view of a cascade according to the present disclosure.

FIGS. 1, 2 and 3 show a nacelle including a front side indicated by the arrow FR, covering a cold air annular flow path 2, terminating rearwards in one or several movable cowl(s) 4 including an acoustic internal surface 6 and an external surface 8, forming an internal box 16 therebetween.

The movable cowls 4 are extended forwards outside the nacelle, by fixed front cowls 10, fixedly attached to the structure of the nacelle.

Thrust reversal cascades 14 disposed around the nacelle at the front of the movable cowls 4, fastened between a circular movable front frame 12 and a circular movable rear frame 52, are displaced rearwards by actuating cylinders forming a motorization, bearing on a fixed portion of the nacelle.

With the closed movable cowls 4 shown in FIGS. 1, 2 and 3, the major portion of the cascades 14 is disposed under the fixed front cowls 10, a small rear portion of these cascades entering the internal box 16 of the movable cowls 4.

An annular fixed deflection edge 18 is disposed inside the cascades 14 near their rear end. In the closed position of the movable cowls 4, an annular sealing gasket 20 disposed at the front end of the internal surface 6 of these cowls, bears on the rear of the fixed deflection edge 18 to provide sealing.

Tilting flaps 54 are fastened flat under the cascades 14, by hinges 76 connected to the rear frame 52.

Outside the cascades 14, several linkage systems connecting these cascades 14 and the movable cowls 4, each include a set comprising a lever and connecting rods disposed in the same tangent plane, which are connected by articulations such as pivots whose axes are substantially perpendicular to this tangent plane.

By convention, a side named right side, shown in FIG. 3 by the arrow R, corresponds to the right of this figure when looking forwards.

A fixed pivot 30 connected to a fixed element of the structure of the nacelle, supports a first lever 28 forming a "V" comprising a front arm 32 and a rear arm 34, which are interconnected at the level of this pivot while forming an angle of about 60°. The front arm 32 is turned forwards, the rear arm 34 is turned rightwards.

The end of the rear arm 34 of the first lever 28 receives by a first movable pivot 42 the front end of a cascade connecting rod 44, which has at its rear end a pivot 46 fastened to the cascades 14. The rear arm 34 and the cascade connecting rod 44 form an acute angle of about 30° therebetween.

The end of the front arm 32 of the first lever 28 receives by a second movable pivot 36 the front end of a cowl connecting rod 38, which has at its rear end a pivot 40 fastened to the movable cowls 4. The cowl connecting rod 38 turned rearwards, forms with the front arm 32 an acute angle of about 45°, in this first position.

Figure 4:
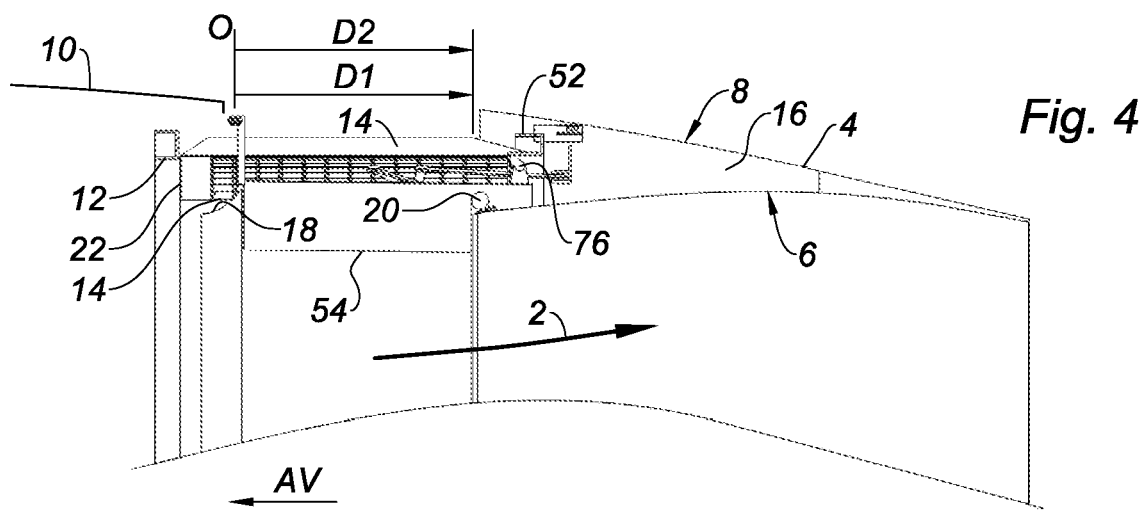
FIG. 4 is a cross-sectional view of a nacelle with closed cowls with a stroke of the cascades of 80% according to the present disclosure.
Figure 5:
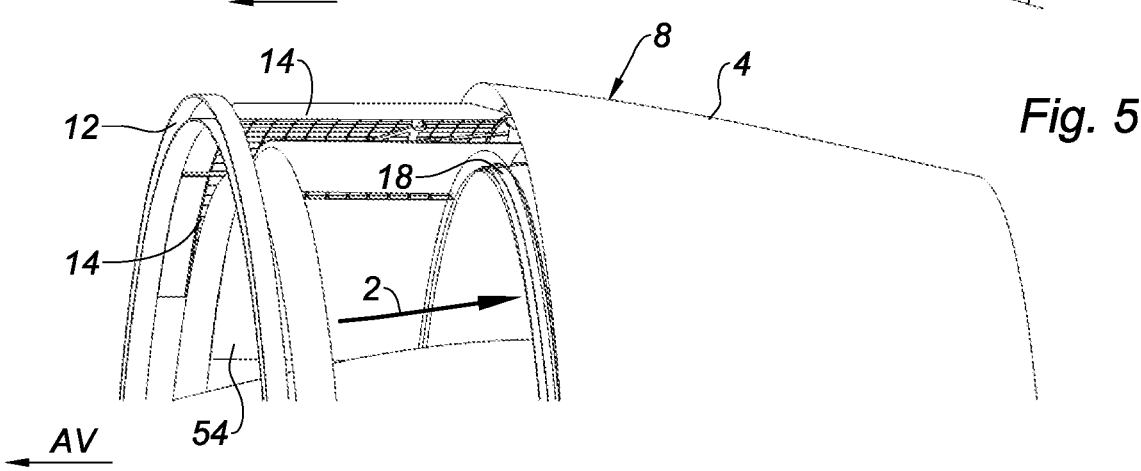
FIG. 5 is a perspective view of a nacelle with closed cowls with a stroke of the cascades of 80% according to the present disclosure.
Figure 6:
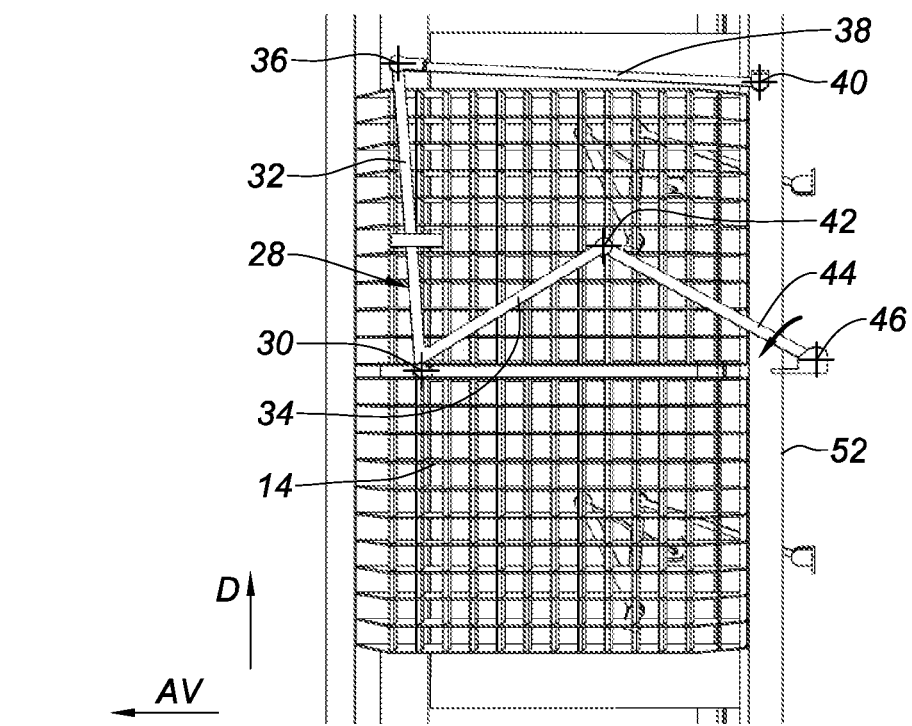
FIG. 6 is a top view of the cascades with a stroke of the cascades of 80% according to the present disclosure.

FIGS. 4, 5 and 6 show a rearward displacement of the cascades 14 under the effect of their actuating cylinders, over a stroke representing 80% of their total displacement.

The backward movement of the cascades 14 has caused an identical backward movement of the cascade pivot 46. The cascade connecting rod 44 has pivoted forwards, resulting in a rearward pivoting of the first lever 28. The cascade connecting rod 44 now forms with the rear arm 34 of this lever 28 an obtuse angle of about 120°.

The front arm 32 of the first lever 28 turned rightwards, forms a substantially a right angle with the cowl connecting rod 38, driving the cowl pivot 40 as well as the movable cowls 4 in a rearward stroke substantially identical to that of the cascades 14.

The strokes D1 and D2 shown in FIG. 4 are obtained, respectively for the cascades 14 and the cowls 4.

Figure 7:
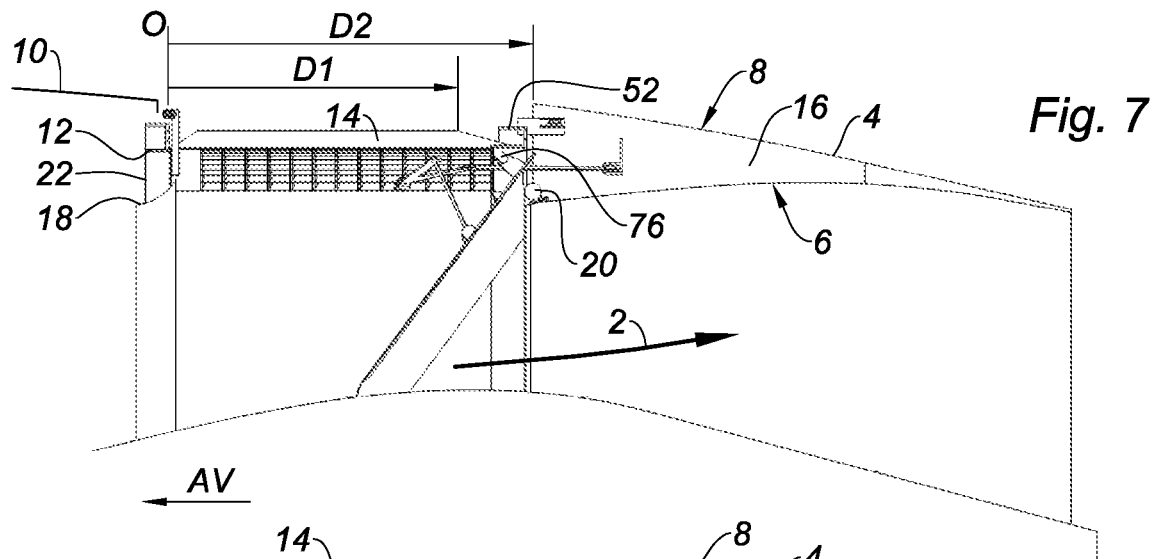
FIG. 7 is a cross-sectional view of a nacelle with closed cowls with a stroke of the cascades of 100% according to the present disclosure.
Figure 8:
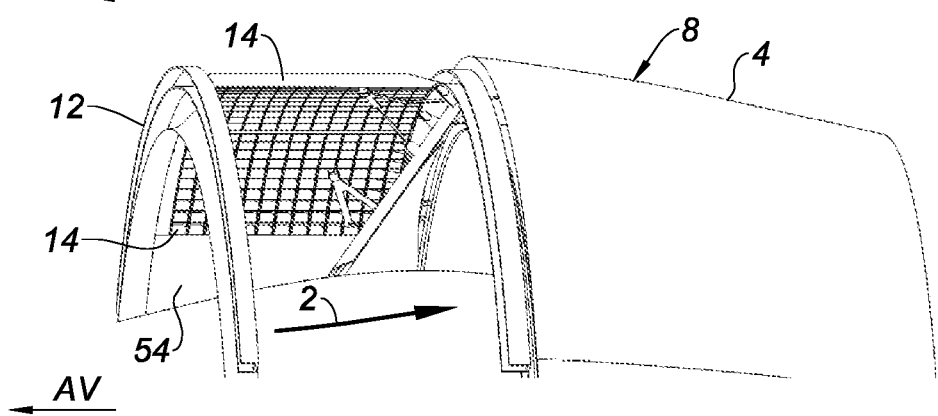
FIG. 8 is a perspective view of a nacelle with closed cowls with a stroke of the cascades of 100% according to the present disclosure.
Figure 9:
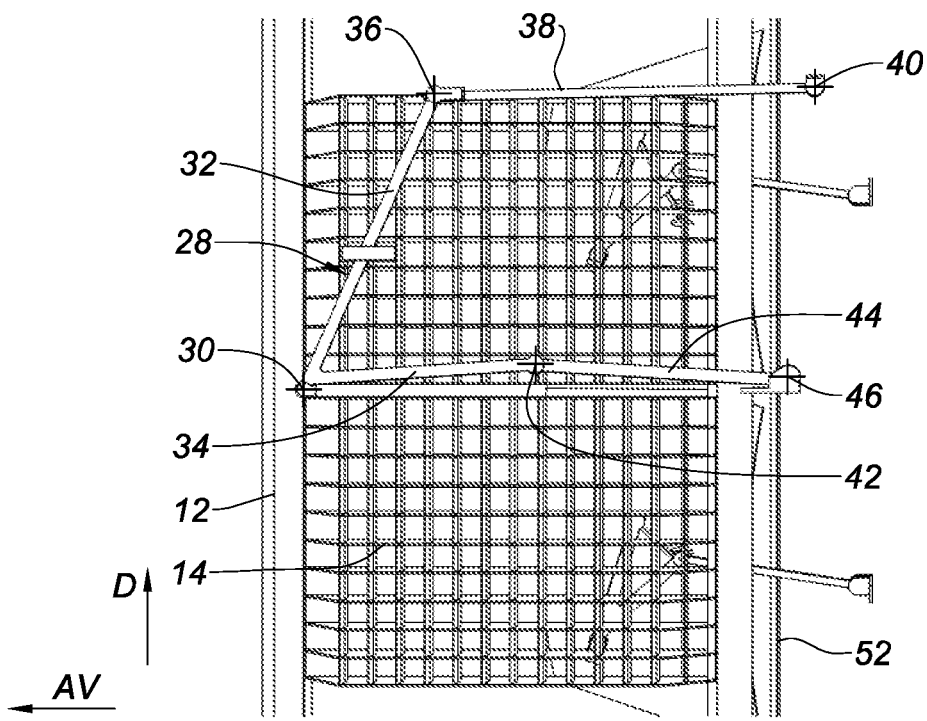
FIG. 9 is a top view of the cascades with a stroke of the cascades of 100% according to the present disclosure.

FIGS. 7, 8 and 9 show a rearward displacement of the cascade 14, on a complementary stroke representing 100% of its total displacement.

The complementary backward movement of the cascades 14 has caused an identical backward movement of the cascade pivot 46, resulting in a rearward pivoting of the first lever 28. The cascade connecting rod 44 now forms with the rear arm 34 of this lever 28 a substantially flat angle.

Meanwhile, the front arm 32 of the first lever 28 has pivoted rearwards, and forms with the cowl connecting rod 38 an obtuse angle of about 120°. The cowl connecting rod 38 displaces rearward its cowl pivot 40 as well as the movable cowls 4, to obtain a total stroke of these cowls D2 larger than the stroke of the cascades D1.

The geometry of the first lever 28 and of the connecting rods 38, 44 imparts at the end of this displacement a larger stroke of the cowls 4 compared to that of the cascades 14, shown in FIG. 10. Indeed, the flattening of the angle formed between the cascade connecting rod 44 and the rear arm 34 makes a small displacement of the cascades 14, while the movement of the front arm 32 turned substantially rightwards, causes a large displacement of the cowl connecting rod 38 and its cowl pivot 40 relative to the cascades.

FIGS. 11 and 12 show the tilting flaps 54 each fastened by two rear hinges 76 to the rear frame 52.

A control mechanism disposed above each flap, in its central portion between the hinges 76, includes a second lever 60 forming a "V" disposed flat under a cascade 14, comprising a front arm 68 and a rear arm 64 forming an angle of about 30° therebetween. The second lever 60 is fastened to the cascade 14 by a pivot 62 disposed at the junction of its two arms 64, 68.

A rear tie-rod 56 has a front end connected by a first ball joint 66 to the rear arm 64, and its rear end connected by a second ball joint to a fitting 58 connected to the movable cowls 4.

A front tie-rod 72 has one end connected by a third ball joint 70 to the front arm 68, its other end being connected by a fourth ball joint 74 to the upper face of the tilting flap 54, substantially at the middle of this flap.

The control mechanism being fastened on one hand to a cascade 14 by the pivot 62, and on the other hand to the rear cowls 4 by the second ball joint, it is actuated by the difference in movement between these two sets. During the first stroke representing more than 70% of the displacement of the actuator and the cascades 14, advantageously about 80%, the tilting flaps 54 do not deploy.

During the complementary stroke beyond 80% of the displacement, the rear tie-rod 56 pulls back the second lever 60, which is held by its pivot 62.

In turn, the second lever 60 pulls back the front tie-rod 72, which pushes down the movable flap 54 via the fifth pivot 74 fastened on this flap. A deployment of the movable flaps 54 which largely close the cold air annular flow path is achieved by pumping the flow radially outwards via the cascades 14.

It should be noted that each control mechanism forms a compact device remaining integrated flat between a cascade 14 and a movable flap 54 in the closed position.

FIG. 13 shows the rear tie-rod 56 comprising two portions sliding axially relative to each other, connected by a helical spring working in compression 80 guided in an axial case.

At the beginning of displacement of the movable cowls 4, the rear tie-rod 56 is compressed as shown at the bottom of FIG. 13, and the spring 80 is in compression which maintains a force on the movable flaps 54 which presses them upwards on stops, and avoids clearances and vibrations of these flaps.

The spring 80 is also compressed in the phases between 0% and 70% for which the movable cowls 4 can be at the front of the cascades 14.

At the end of displacement of the movable cowls 4, the rear tie-rod 56 works in tension by imposing the lowered position of the movable flaps 54. The spring 80 is relaxed.

The control mechanisms disposed between the movable cowls 4 and the cascades 14, automatically actuate the tilting flaps 54 only at the end of the stroke of these cowls, without the need for autonomous actuation systems, which simplifies the nacelle, reduces the mass and the costs.

The control mechanisms as well as the tilting flaps 54 are in the closed position fully integrated above the acoustically treated internal surface 6 of the movable cowls 4, they do not include any element coming into the cold air annular flow path 2, which improves the aerodynamics, and the acoustically treated surface lining in this flow path.

Figure 14:
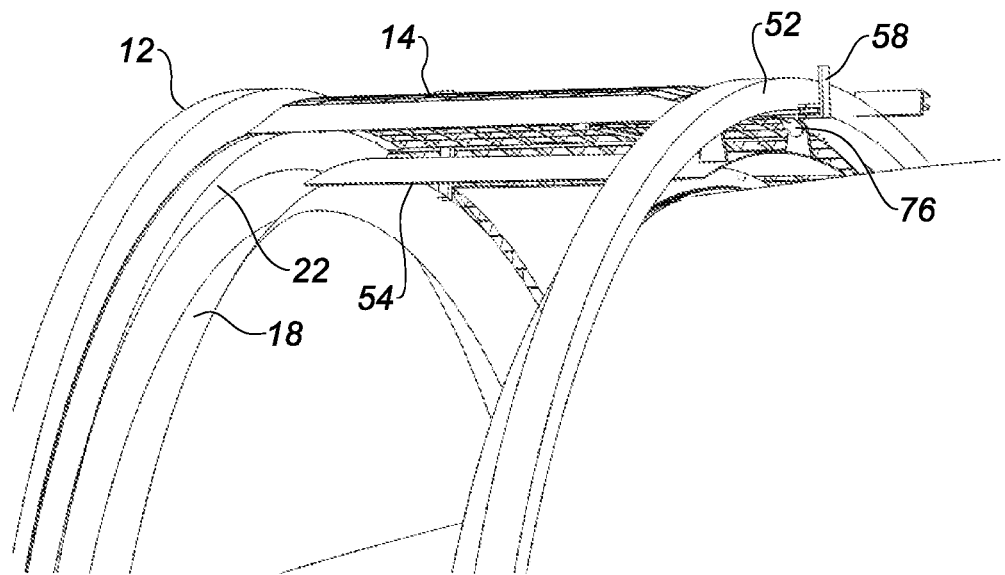
FIG. 14 illustrates the deflection edge of the movable front frame for a stroke of the cascades of 80% according to the present disclosure.

FIG. 14 shows the annular fixed deflection edge 18 disposed inside the cascades 14, which remains in a fixed position.

Figure 15:
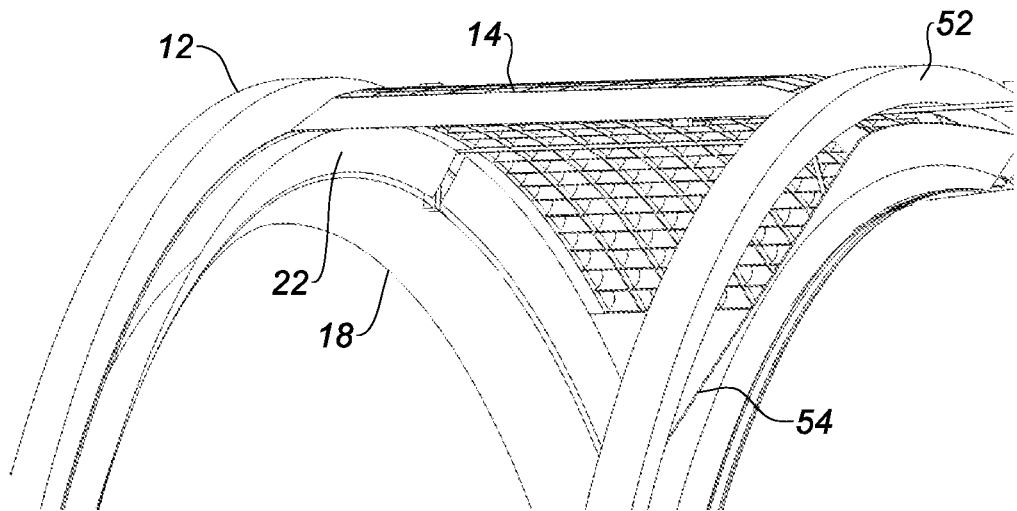
FIG. 15 illustrates the deflection edge of the movable front frame for a stroke of the cascades of 100% according to the present disclosure.

FIG. 15 shows an annular movable deflection edge 22, forming a radial crown fastened to the movable front frame 12 inside the cascades 14.

The movable deflection edge 22 is fitted radially outwards of the fixed deflection edge 18 when the cascades 14 are fully deployed, in order to complete a deflection surface of the flow radially outwards. In this manner, a substantially continuous and sealed surface is formed to guide the flow of air radially outwards, while avoiding its passage forwards below the fixed front cowls 10.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for a turbojet engine including a thrust reverser, the nacelle comprising:
   thrust reversal cascades disposed around the nacelle;
   at least one movable cowl adjacent to the thrust reversal cascades in a closed position;
   a plurality of linkage systems connecting the at least one movable cowl and the thrust reversal cascades; and
   tilting flaps for closing a cold air annular flow path,
   wherein each of the plurality of linkage systems is disposed radially outside the thrust reversal cascades and includes, in a tangential plane, a lever, a pair of connecting rods, a first movable pivot, a second movable pivot, and fixed pivots, wherein the fixed pivots comprise a first fixed pivot connected to a fixed structure of the nacelle, a cascade pivot connected to the thrust reversal cascades, and a cowl pivot connected to the at least one movable cowl, each of the plurality of linkage systems imparting, at an end of an opening movement, a stroke of the at least one movable cowl larger than a stroke of the thrust reversal cascades, wherein the lever of each of the plurality of linkage systems comprises two arms forming a V, and each of the pair of connecting rods is fastened to an end of a corresponding one of the two arms by one of the first and second movable pivots.

2. The nacelle according to claim 1, wherein the stroke of the at least one movable cowl is larger than the stroke of the thrust reversal cascades from a backward movement of the thrust reversal cascades exceeding 70% of a total backward movement.

3. The nacelle according to claim 1, wherein the two arms of the lever of each of the plurality of linkage systems include a front arm and a rear arm connected by the first fixed pivot, wherein the connecting rod includes a cascade connecting rod fastened to the thrust reversal cascades and a cowl connecting rod fastened to the at least one movable cowl, the rear arm being connected to the cascade connecting rod by the first movable pivot, the front arm being connected to the cowl connecting rod by the second movable pivot.

4. The nacelle according to claim 3, wherein in the closed position, each of the connecting rods and the corresponding one of the two arms forms an acute angle.

5. The nacelle according to claim 4, wherein in a fully open position, the cowl connecting rod forms with the front arm an obtuse angle.

6. The nacelle according to claim 1 further comprising control mechanisms for controlling the tilting flaps, which in the closed position are fully integrated above an internal surface of the cold air annular flow path.

7. The nacelle according to claim 6, wherein each of the control mechanisms is connected to the at least one movable cowl and the thrust reversal cascades, while being actuated by a relative movement between the at least one movable cowl and the thrust reversal cascades.

8. The nacelle according to claim 7, wherein each of the control mechanisms includes a second lever fastened by a second fixed pivot to the thrust reversal cascades, and connected by a first tie-rod to the at least one movable cowl, and a second tie-rod to a corresponding one of the tilting flaps.

9. The nacelle according to claim 1 further comprising a deflection edge forming an annular guide of cold air disposed at a front of the thrust reversal cascades, the deflection edge comprising a movable radially outer portion fastened to the front of the thrust reversal cascades, which fits in an open position on a fixed radially inner portion to provide a continuous surface.

* * * * *